United States Patent [19]

Barcell

[11] Patent Number: 4,974,528
[45] Date of Patent: Dec. 4, 1990

[54] METHOD AND APPARATUS FOR THE TREATMENT OF CONTAMINATED SOIL

[75] Inventor: Robert B. Barcell, Littleton, Colo.

[73] Assignee: Ryan-Murphy, Inc., Denver, Colo.

[21] Appl. No.: 447,600

[22] Filed: Dec. 8, 1989

[51] Int. Cl.⁵ .......................... F23D 3/00; F23D 5/00; F23D 9/00

[52] U.S. Cl. .................................. 110/240; 110/226; 110/229; 110/236; 110/246; 110/346

[58] Field of Search ............... 110/236, 237, 226, 246, 110/346, 229, 240

[56] References Cited

U.S. PATENT DOCUMENTS

| | | | |
|---|---|---|---|
| 1,754,854 | 4/1930 | Gelstharp. | |
| 3,705,711 | 12/1972 | Selandt et al. | 263/32 R |
| 4,207,062 | 6/1980 | Moench et al. | 432/111 |
| 4,427,376 | 1/1984 | Etnyre et al. | 432/105 |
| 4,576,572 | 3/1986 | Mueller et al. | 432/13 |
| 4,667,609 | 5/1987 | Hardison et al. | 110/236 |
| 4,715,965 | 12/1987 | Sigerson et al. | 210/800 |
| 4,738,206 | 4/1988 | Noland | 110/346 |
| 4,746,290 | 5/1988 | DeCicco et al. | 432/19 |
| 4,748,921 | 6/1988 | Mendenhall | 110/346 |
| 4,787,323 | 11/1988 | Beer et al. | 110/346 |
| 4,815,398 | 3/1989 | Keating, II et al. | 110/236 X |
| 4,827,854 | 5/1989 | Collette | 110/226 X |
| 4,840,129 | 6/1989 | Jeliner | 110/226 X |
| 4,864,942 | 9/1989 | Fochtman et al. | 110/236 X |
| 4,875,420 | 10/1989 | Hay et al. | 110/240 X |

Primary Examiner—Edward G. Favors
Attorney, Agent, or Firm—John E. Reilly

[57] ABSTRACT

A vehicle-mounted system for removing hydrocarbon contaminants from the soil has an inclined rotary kiln which is rotated about a substantially horizontal axis of rotation, a burner assembly at the discharge end of the kiln and a hopper for loading soil into the inlet end to advance through the kiln and be directly heated by the burner assembly. The exhaust stream created in the kiln is drawn through a baghouse for removal of fines, then through the catalytic incinerator to burn any unburned constituents in the exhaust stream. The temperature of the exhaust stream is monitored prior to its passage into the incinerator and at the discharge end of the incinerator as well; and the concentration of hydrocarbon constituents in the exhaust stream is regulated either by introduction of air into the exhaust stream as it is discharged from the kiln or by recirculating a portion of the exhaust stream, after filtration, into the kiln.

19 Claims, 3 Drawing Sheets

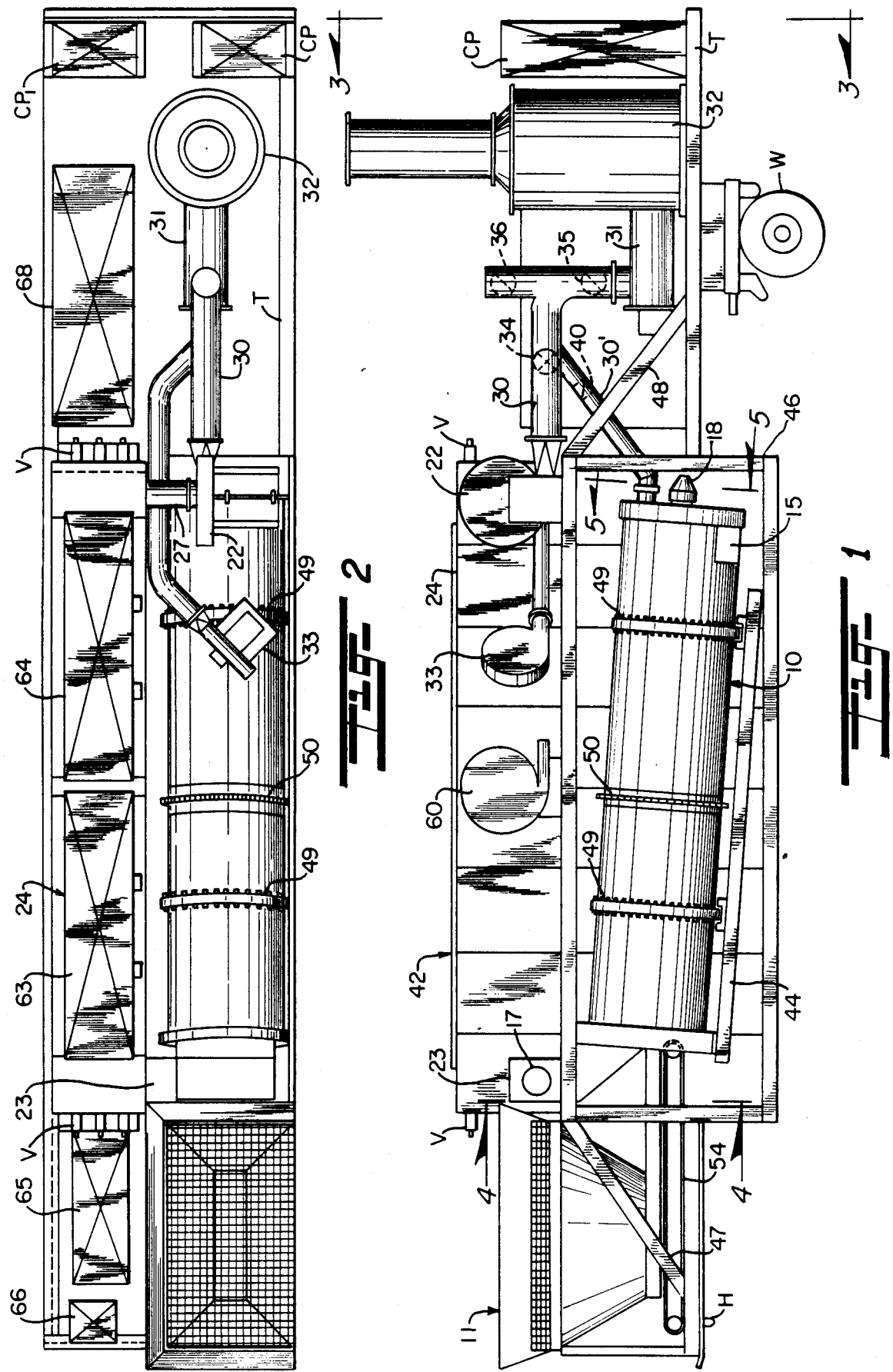

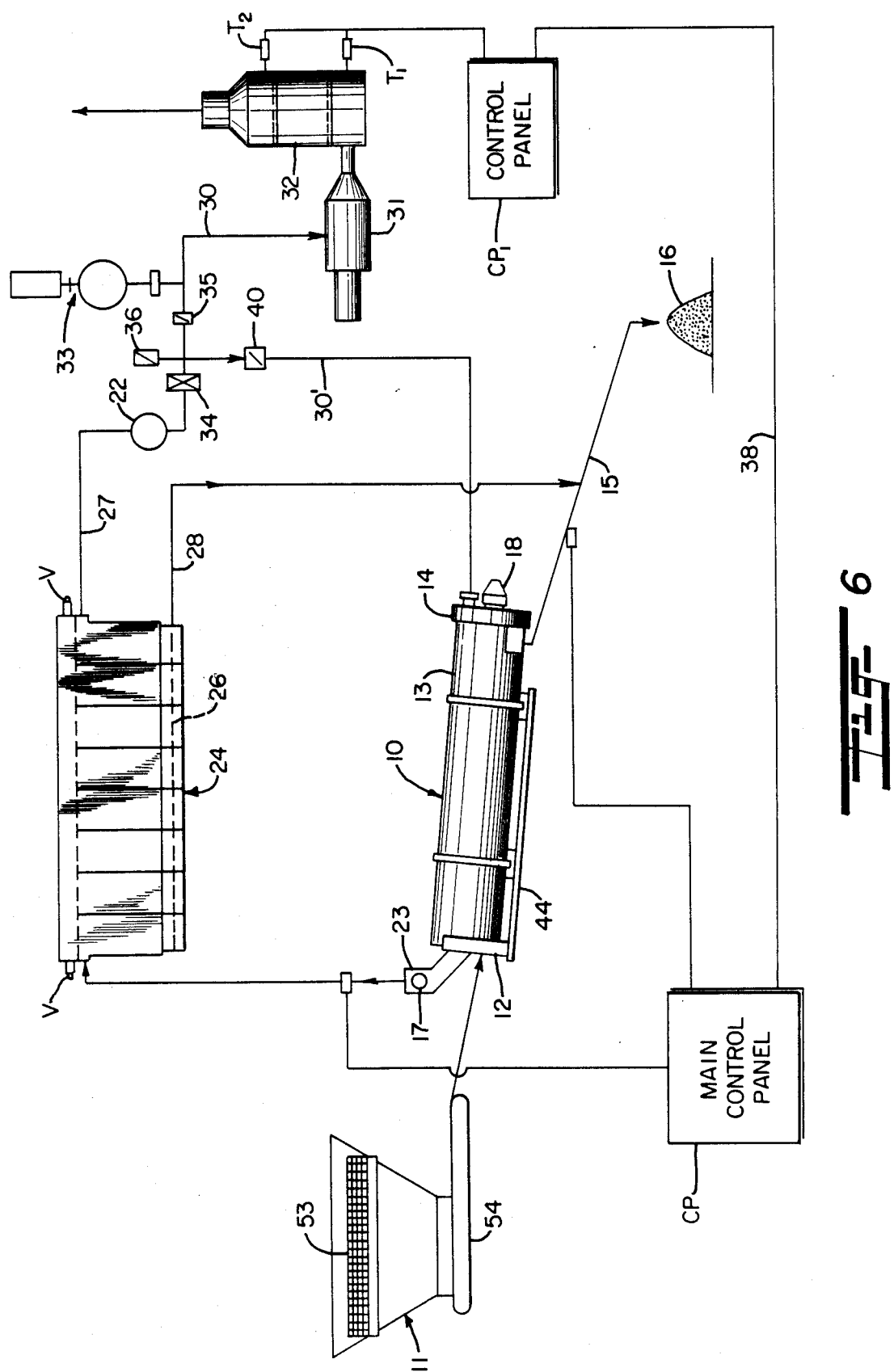

METHOD AND APPARATUS FOR THE TREATMENT OF CONTAMINATED SOIL

This invention relates to the treatment of contaminated soil; and more particularly relates to a novel and improved method and apparatus for the removal of volatile organic contaminating materials from soil in a manner that is environmentally acceptable.

BACKGROUND AND FIELD OF THE INVENTION

Historically, soils contaminated with the lighter fractions of petroleum hydrocarbons, such as, gasoline, diesel fuel, and light burner fuels, have not been considered to be a major environmental problem. As this perception has changed, a number of systems have been devised to solve this problem. However, such systems have suffered from a number of drawbacks among which are (1) moving, but not truly cleaning, the soil; (2) difficulty of implementation; (3) limited effectiveness; (4) high cost; (5) inability to use at smaller sites; or (6) creating air or water pollution in the process of cleaning the soil.

It is therefore proposed to provide for a method and apparatus for separating the lighter hydrocarbon distillates from soil and in such a way as to achieve an effective thermal treatment which fully cleans the soil and is cost-effective. At the same time, it is desirable that the apparatus be of compact size and relatively inexpensive to produce so as to make it conformable for use on small sites; and the method of treating the exhaust gas will make the system both less expensive to operate and less environmentally damaging than alternative technologies. For example, it is desirable to employ a baghouse or filtering unit to efficiently remove fines from the hot exhaust gas stream produced during combustion of the lighter fractions, but in the past a filtering unit has not been practical for use because of the danger of explosion of the exhaust gases in passing through the unit.

Representative of past systems and methods is U.S. Pat. No. 4,746,290 to S. G. DeCicco et al in which contaminated soil passes downwardly through an inclined dryer, and a burner is movably positioned at the lower end of the dryer having an adjustable vented area to regulate the amount of combustion air. The treated waste material is carried into a cooler and discharge conveyor while the off gas is advanced to a combustion unit having a holding section for the destruction of the unwanted organics. In U.S. Pat. No. 4,715,965 to A. L. Sigerson et al, a preheater and heat exchanger are used in combination to vaporize the contaminants in the soil passed therethrough and the vaporized constituents are then passed through filtration stages to remove any solids. In this process, the combustion gas is taken to a temperature on the order of 750° F. to 1800° F. Other representative patents of interest are U.S. Pat. Nos. 4,738,206 to J. W. Noland, 4,787,323 to G. L. Beer et al, 4,667,609 to R. Hardison et al, 4,576,572 to E. E. Mueller et al and 4,427,376 to R. E. Etnyre et al. Generally lacking in the foregoing and other systems that have been devised is a compact, efficient system which can be truck-mounted or otherwise transportable to intended sites in the treatment of contaminated soils and efficient removal and disposal of such contaminants.

SUMMARY OF THE INVENTION

Accordingly, it is an object of the present invention to provide for a novel and improved method and apparatus for the treatment of contaminated soils and particularly efficient removal and disposal of the lighter fractions of hydrocarbons from the soil.

Another object of the present invention is to provide for a novel and improved method and apparatus for removing lighter fractions of volatile hazardous organic contaminants in the soil at a relatively low temperature below the vaporization point of higher boiling organic contaminants and to enable the efficient recovery and destruction of same without environmental pollution.

A further object of the present invention is to provide for a novel and improved apparatus for treating contaminated soil and specifically for the removal of lighter fractions of hydrocarbons in the soil in which the complete system for treatment and removal can be truck-mounted or otherwise transportable to different sites of use; and further wherein the concentration of the lighter fraction volatilized can be maintained at a sufficiently low level which will permit utilization of a baghouse or fabric filtering system without danger of explosion.

In accordance with the present invention, there has been devised a novel and improved vehicle-mounted apparatus for removal of hydrocarbon contaminants from soil and other waste material. Broadly, the preferred form of apparatus comprises a wheeled frame, an inclined rotary kiln mounted on the frame having an inlet at the upper end of the kiln and a discharge at a lower end of the kiln, and means for rotating the kiln about a substantially horizontal axis of rotation. A burner assembly is mounted in the discharge end of the kiln and includes means for directing a gaseous flame into the interior of the kiln toward the inlet end, and means are provided for loading the soil into the inlet end of the kiln for advancement under rotation through the kiln so as to be directly heated by the gaseous flame for a time period sufficient to volatilize any lighter hydrocarbon constituents in the soil. A supplementary air control means is provided for controlling the introduction of air into the exhaust stream independently of the ignition means in order to control the concentration of hydrocarbon constituents in the exhaust stream. Means are provided for inducing the flow of an exhaust stream consisting of combustion gases, volitalized hydrocarbons and fines upwardly through the kiln; filtering means are provided to remove any fines from the exhaust stream after discharge from the kiln; and an incinerator includes a burner and combustion air blower associated with the incinerator for raising the temperature of the exhaust stream from the filtering means to a level sufficient to oxidize any unburned or partially burned hydrocarbon constituents or carbon monoxide in the exhaust stream. First temperature monitoring means senses the temperature of the exhaust stream prior to its passage into the incinerator and second temperature monitoring means senses the temperature of the exhaust stream at a discharge end of the incinerator. As a result, it is possible to employ a baghouse or fabric filter as the filtering means for the efficient removal of fines from the exhaust stream preliminary to its introduction into the incinerator.

In carrying out the method of the present invention, the soil containing hydrocarbons is advanced through a dryer or kiln which has a combustion chamber therein, a combustion gas is directed into the combustion chamber and ignited to produce a gaseous flame for volatilizing the hydrocarbons in the soil and forming an exhaust stream, the exhaust stream being induced to flow outwardly through the kiln in counter current relation to the movement of the soil through the dryer and is filtered to remove any solids or fines therefrom. The exhaust stream is then discharged from the filter and subjected to an incineration step in which any remaining unburned or partially burned hydrocarbons are burned as a preliminary to release of the exhaust gases into the atmosphere. The soil is continuously discharged, following combustion of the hydrocarbons, into a waste collection area.

The above and other objects, advantages and features of the present invention will become more readily appreciated and understood from a consideration of the following detailed description of a preferred embodiment of the present invention when taken together with the accompanying drawings of a preferred embodiment of the present invention, in which:

BRIEF DESCRIPTION OF THE DRAWINGS

FIG. 1 is a side view in elevation of a preferred form of vehicle-mounted apparatus in accordance with the present invention;

FIG. 2 is a top plan view of the apparatus shown in FIG. 1;

FIG. 6 is a somewhat diagrammatic view of the preferred method and apparatus of the present invention.

DETAILED DESCRIPTION OF THE PREFERRED EMBODIMENT

Figure 3:
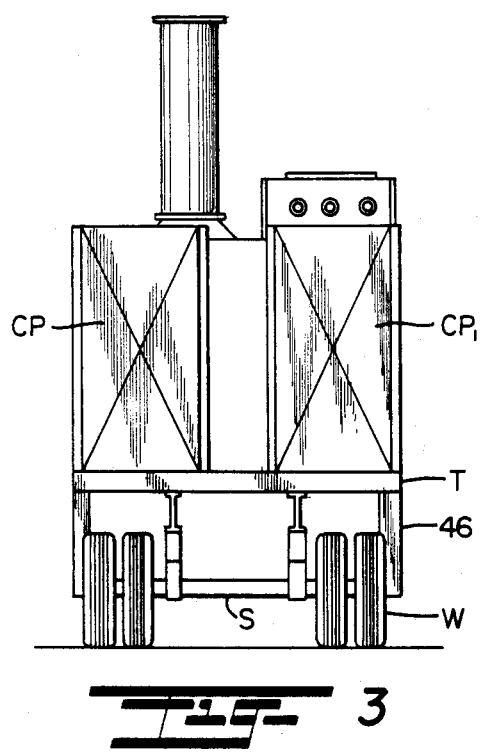
FIG. 3 is an end view taken at lines 3—3 of FIG. 1.
Figure 4:
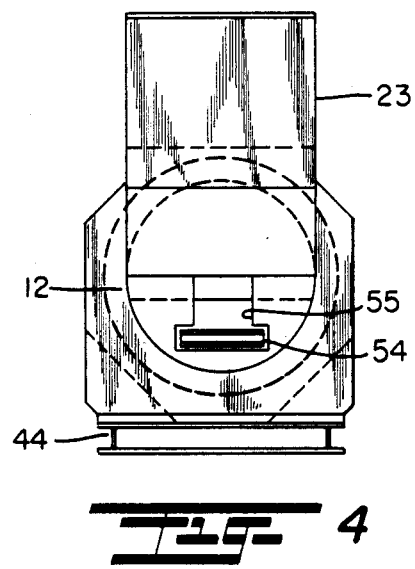
FIG. 4 is another end view taken at lines 4—4 of FIG. 1 of the inlet end of the dryer section.

Referring in more detail to the drawings and particularly to FIG. 6, the preferred apparatus of the present invention comprises a dryer or kiln 10 mounted for rotation about an inclined axis for gravity flow of contaminated soil from a loader 11 at upper end 12 downwardly through a combustion area 13 adjacent to lower discharge end 14. The soil or remaining aggregates are discharged from the lower end 14 through line 15 into a waste collection area 16. A slide gate 17 is stationed at the inlet end 12 to regulate the admission of fresh air from the atmosphere into the exhaust stream from the combustion area 13.

The downward flow of soil through the kiln 10 is regulated in part by flights located internally of the kiln and which in a conventional manner are capable of exposing it as much as possible to the combustion gases. A burner system 18 extends through the lower end 14 of the kiln 10 and which includes a combustion air blower 20 to direct air into the burner system 18 for intermixing with a propane fuel and discharge as a vapor through a burner nozzle into the combustion area 13. Most desirably, the soil temperature in the combustion area is maintained in the range of 350° F. to 650° F. for most complete burning or volatilization of the lighter fraction hydrocarbons in the soil.

The combustion gases formed in the combustion area 13 intermix with the volatilized hydrocarbons and are drawn off as an exhaust stream in countercurrent relation to the movement of the soil upwardly through the kiln 10 and escape from the inlet end 12 under the influence of the suction side of a process air blower 22. These exhaust gases are delivered via conduit 23 and baghouse 24 into the suction side of the blower 22. In the baghouse 24 any fines are removed from the gases and collected in the lower end of the baghouse where they are advanced by an auger 26 toward one end of the baghouse for removal through line 28 to the waste collection area 16.

The main process air blower 22 draws the exhaust gases from the baghouse 24 through line 27 and discharges through line 30 which leads to a preheat burner 31 at the inlet end of a catalytic incinerator 32. Typically, the exhaust gases recovered from the inlet end of the kiln will have dropped in temperature after removal from the combustion area 13 into the range of 225° F. to 375° F. It is therefore necessary to raise the temperature of these gases through the preheat burner 31 to no less than 600° F., this temperature being monitored between the preheat burner and catalyst bed. A variable control damper 34 is positioned in the line 30 to modulate the mass flow rate of gases through the line 30, particularly during start-up. An on/off damper 35 is positioned in the line 30 directly upstream of the inlet to the incinerator 32; and, since the incinerator is not energized until the gases are brought up to temperature during the start-up period, similarly the on/off damper 35 will remain in an off position in the initial stages of start-up but another damper 36 is open to permit venting of any exhaust gases to the atmosphere. A quench air blower 33 communicates with the line 30 to supply additional air, it needed, to be intermixed with the exhaust gases flowing into the catalytic incinerator. Another variable damper 40 is positioned in line 30' to regulate the amount of exhaust gases recirculated back to the combustion area 13.

A main control panel CP will sense the temperatures in the conduit 23 as well as the flow line 15 and has a connecting line 38 to an auxiliary control panel $CP_1$ for the incinerator 32. Briefly, the control panels are correlated to modulate the fuel/air ratio and particularly the flow rate of air into the combustion area to optimize the volatilization of the hydrocarbons from the soil but at the same time assure that the concentration of hydrocarbons in the exhaust gases will not exceed a predetermined value or limit. By maintaining the gases within a predetermined value, it is possible to circulate the gases through baghouse 24 to filter out any solids or fines as a preliminary to further incineration of any unburned hydrocarbons.

In exiting the baghouse 24, although the exhaust gases are clear and colorless, there may nevertheless be varying amounts of unburned or partially burned hydrocarbons contained in the gases which cannot be emitted directly into the atmosphere. Accordingly, it is desirable in accordance with the present invention to employ a form of incinerator which will completely eradicate the unburned or partially burned constituents in the gases and most desirably at the lowest possible temperature. To this end, the catalytic incinerator 32 will effectively treat gases which have been raised to not less than 600° F. and to raise them to a temperature of no more than 1200° F. A preferred form of catalytic incinerator is the Model CKM-300 CATOX Reactor, manufactured and sold by Dedert Corp. of Olympia Fields, Ill., in which gases are directed into the incinerator and advanced through a catalyst bed which will cause impurities in the gases to completely oxidize substantially before being vented to the atmosphere. Automatic temperature limit switches at the inlet and discharge ends insure the complete destruction of the hydrocarbons in the presence of oxygen. An alternate method of incineration is to employ a thermal incinerator, such as, a Model Flame Bath 3.6-D-5, manufactured and sold by Sur-Lite Corp., of Santa Fe Springs, Calif. Typically, the thermal incinerator will perform the same chemical reaction as the catalytic incinerator but at a much higher temperature in the range of 1300° F. to 1700° F. The catalytic incinerator is preferred since it utilizes considerably less fuel to accomplish the desired end result, is less expensive to operate and produces less of the gases which may tend to produce a "greenhouse" effect. Furthermore, the catalytic incinerator lends itself well to use as a part of a compact, truck-mounted unit as hereinafter described which is readily transportable to different intended sites of use. Thermocouples $T_1$ and $T_2$ are provided at the inlet and discharge ends, respectively, of the incinerator 32 to monitor the inlet and exhaust temperatures of the gases. There are three levels of control by which the temperature can be regulated; namely, (1) reduce the hydrocarbon concentration in the exhaust gases either by utilization of the quench air blower 33, increase the amount of exhaust gases recirculated into the combustion area 13, or by opening the slide gate 17; (2) turn off the dryer burner 18; or (3) shut down the entire system.

There is shown in FIGS. 1 to 5 a preferred form of apparatus 42 for treating contaminated soil in which the entire apparatus is mounted on a wheeled frame or trailer bed as designated at T and which has ground-engaging wheels W at the rear end of the trailer journaled on a common shaft S and suspended from the frame T in a conventional manner. A forward end of the truck bed T has a standard hitch H and, although not shown, suitable legs are mounted at the corners in order to support the bed T in a level position when the apparatus 42 is in operation. Broadly, the loader 11, dryer 10 and incinerator 32 are arranged in tandem along one side of the bed T, and the baghouse 24 extends along the opposite side in closely spaced, parallel relation to the dryer 10. The dryer 10 is mounted on an inclined base 44 within a generally rectangular open frame 46 which is permanently affixed within a recessed portion on one side of the main frame T so that the dryer 10 is suspended partially beneath the main frame T, and the frame is reinforced by angular braces 47 and 48 extending from the upper end of the frame 46 downwardly in a forward and rearward direction, respectively, to rest on the upper surface of the main frame T. In this relation, the dryer is inclined such that the inlet end 12 is slightly above the level of the frame T, and the outlet end 14 is below the level of the inlet end 12 with its center line substantially aligned with the main frame T. The dryer 10 is journaled for rotation on the base 44 by forward and rearward spaced circumferential bearings 49, and a chain sprocket 50 extends circumferentially of the dryer for rotation by a motor, not shown, but which is drivingly connected to the chain sprocket 50.

The loader 11 is mounted at the front corner of the truck bed and includes a hopper or bin 52 having an upper inclined grate 53 at the upper end of the hopper 52 to limit the size of materials that can be deposited through the hopper onto a horizontal conveyor 54. Preferably, the grate 53 is inclined downwardly toward one side of the bed T on the dryer side so that any materials that will not pass through the grate 53 can accumulate on the ground surface to one side of the bed T. The conveyor 54 is motor-driven to advance the materials in a rearward direction through the entrance 55 at the forward inlet end 12, as best seen from FIG. 4. The soil then is advanced by the rotating dryer 10 downwardly toward the combustion area 13 preferably with the aid of spiral flighting, not shown, along the internal surface of the dryer. As such, the flighting is well known and intended to cause tumbling and some further reduction in size of the soil materials as they advance into the combusted area 13. In the combustion area 13, the flighting is modified somewhat so as to retard the advancement of the soil and assure complete exposure to the flame generated by the main process burner 18 for maximum burning of the hydrocarbons in the soil. For example, generally paddle-shaped flighting may be mounted along the internal wall of the dryer in the combustion area 13 and which will tend more to pick up the soil and to retain it in shallow dish-shaped pockets as a preliminary to discharge via elevator E into the waste collection area 16.

The main process burner 18 is designed to thoroughly burn the lighter fractions of the hydrocarbons in the soil and, for this purpose, should be capable of heating the soil into a temperature range on the order of 350° F. to 650° F. One type of burner which can be employed is a propane burner Model CR4-9-30, sold by Power Flame, Inc., of Parsons, Kans. and which will cause vaporization and mixture of a propane fuel with combustion air supplied by the combustion air blower incorporated into the burner 18. The burner proper is aligned with the central opening in the outlet end 14 for projection into the combustion area 13 and is normally capable of raising the temperature of the flame within an enclosed space, such as, the combustion area 13 into the range of 3300° F. However, in accordance with the present invention, as noted earlier, a portion of the exhaust gases from the discharge side of the baghouse may be diverted over line 30' into the combustion area 13 for mixture with the exhaust stream to maintain the hydrocarbon concentration below a predetermined level.

Figure 5:
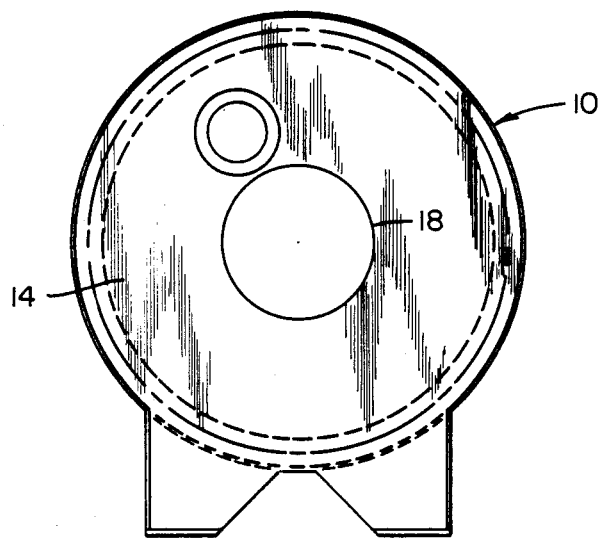
FIG. 5 is an end view of the opposite end of the dryer to that illustrated in FIG. 4.

Temperature control is further aided by the introduction of fresh air from the atmosphere through a slide gate 17 which, as shown in FIG. 5, is mounted in the exhaust duct 23 at the inlet end 12. The slide gate 17 can be adjustably controlled to regulate the amount of air drawn into the exhaust stream 13 in relation to the negative pressure condition created by the process blower 22. As noted from FIGS. 1 and 2, the process blower 22 is mounted on the frame 46 toward the rearward end, and the conduit 30 together with associated dampers extend rearwardly and downwardly into the preheat burner 31 which is mounted on the truck bed directly in front of the catalytic incinerator 32. Housings for the control panels CP and CP are mounted at the rear end of the bed T so as to be easily accessible to the operator. Also shown as mounted on the frame 46 above the dryer 10 are the quench air blower 33 and a combustion air blower 60 for the preheat burner 31. For the purpose of illustrating other parts, the combustion air blower 60 is not illustrated in the plan view of FIG. 2; nor its connection into the preheat burner 31.

The combustion gases along with any volatilized fractions created in the combustion area 13 are drawn in an upward, forward direction through the interior of the dryer 10 and conveyed through the duct 23 at the inlet end 12 of the dryer into the inlet end of the baghouse 24 which is stationed alongside of the dryer 10 on the frame T. Accordingly, the duct 23 extends transversely of the length of the dryer 10 and baghouse 24 so that the exhaust gases flow over a very short distance preliminary to passing through the baghouse 24. One suitable form of filter 24 is a pulse jet baghouse having a capacity of 3000 scfm. When the exhaust gases exit from the dryer 10, they will have cooled off slightly from the combustion area 13 so as to be in a range more on the order of 225° F. to 375° F. It is of a type having upper lift or inspection doors 63 and 64 and an auger as represented at 26 passing through the base of the baghouse to collect the fines from the filter bags and advancing them through line 28 into the waste collection area 16 as previously described. The exhaust gases are drawn from the dryer 10, through the baghouse 24 and through discharge line 27 into the intake side of the blower 22. An air compressor 65 and propane vaporizer 66 are mounted on the truck bed directly in front of the baghouse, and a generator 68 is mounted on the truck bed to the rear of the baghouse, the generator being operative to run all electrical equipment and controls.

In operation, the generator 68 is started and warmed up. The propane vaporizer 66 for the preheat burner 31 and the burner 18 are started up and the outlet pressure in the combustion area 13 is checked. For a propane vaporizer unit generally this pressure should be a minimum of 120 psi. The catalyst incinerator 32 is then started and, at start-up, the slide gate 17 is opened and the catalyst incinerator inlet from burner 31 is closed. The catalyst preheat cycle is started together with the air compressor 65 and the blower 22 with the damper 35 initially in a closed position and a start-up damper is in the open position to vent any gases to the atmosphere. The damper 34 is then advanced to an automatic control position so that it will automatically open when the preheat cycle has been completed. The burner 18 is started, following which the kiln motor drive and baghouse auger drive are activated. The kiln is preheated to 300° F. by the burner 18 following which the soil to be treated is loaded into the hopper section 11. As the material enters the kiln the burner position is increased to maintain a minimum temperature of 275° F. at the baghouse inlet. As the material is discharged from the kiln 10 the burner is regulated to maintain the required discharge temperature and in particular to operate between 350° F. and 650° F. Once the material discharge temperature stabilizes for a period of 5 to 10 minutes the material advancement rate may be increased through the kiln.

Typically, the waste material or soil can be advanced through the dryer 10 at the rate of 10 to 20 tons per hour, depending largely on the amount of moisture and pollution contained in the soil. Other factors considered are the atmospheric pressure and type of soil being treated. Once up to temperature, the damper 36 is closed and the damper 35 is opened to deliver the exhaust gases into the preheat burner section 31, a selected portion of the gases being drawn through the duct 30' back to the combustion area 13. For example, if the main process blower 22 is drawing 3000 cfm through the baghouse 24 from the combustion area, approximately 500 cfm is drawn or recirculated through the line 30' to be combined with the combustion gases, further assuming that the combustion air blower for the burner 18 is discharging at the rate of 1500 cfm. The balance of the air that is needed to regulate the temperature from the dryer 10 is determined by adjustment of the slide gate 17 at the duct 23 and fresh air is then drawn in through the gate 17 as a result of the negative pressure created by the blower 22 in drawing the gases upwardly through the inlet end of the kiln.

Most critical to proper operation of the system is to limit the concentration of hydrocarbons in the exhaust stream below 25% of the lower explosion limit, the concentration being directly related to the outlet temperature of the incinerator 32. This temperature is determined by measurement at the outlet of the catalytic incinerator 32. If the outlet temperature should exceed 1150° F., the dampers 34 and 35 are regulated to increase the percentage of the gas stream that is returned to the combustion area 13; or the slide gate 17 may be opened further to reduce the fuel/air ratio in the exhaust gas stream and thus the temperature of the gases generated. The inlet temperature is monitored between the preheat burner and catalyst bed to assure that the temperature is at 600° F.

It is therefore to be understood that various modifications and changes may be made in the construction and arrangement of parts as well as the sequence of steps comprising the method and apparatus of the present invention without departing from the spirit and scope thereof as defined by the appended claims.

I claim:

1. The method for removing contaminants from soil or other waste matter comprising the steps of:
    advancing the soil through a dryer having a combustion chamber therein, and exposing the soil to a gaseous flame in said combustion chamber to volatilize certain of the contaminants in the soil;
    inducing the flow of the volatilized contaminants in the form of exhaust gases from said combustion chamber whereby to create a negative pressure in said combustion chamber, and drawing outside air into said exhaust gases;
    filtering solids from said exhaust gases as they are discharged from said dryer and transferring said solids into a waste material collection area;
    preheating said exhaust gases to raise their temperature after filtering the solids therefrom; and
    followed by incinerating said exhaust gases at a higher temperature level than said dryer and less than 1700° F. to burn any unburned contaminants remaining in said exhaust gases.

2. The method according to claim 1, including the step of adjustably controlling the amount of outside air introduced into the exhaust gases in response to the negative pressure conditions created.

3. The method according to claim 1, including the step of recirculating a portion of the exhaust gases into said combustion chamber after the filtering step.

4. The method according to claim 1, in which the contaminants are lighter fractions of petroleum hydrocarbons and including the step of regulating the soil temperature in said combustion chamber to be in the range of 350° F. to 650° F.

5. The method according to claim 4, including the step of regulating the temperature of the exhaust gases to be within the range of 225° F. to 375° F.

6. The method according to claim 5, including the step of raising the temperature of the exhaust gases after filtering solids therefrom to the range of 600° F. to 1200° F. to oxidize any unburned hydrocarbons therein.

7. The method for removing lighter hydrocarbon fractions from soil comprising the steps of:
    advancing the soil downwardly through a rotatable, inclined dryer having a combustion chamber at the lower end thereof;

directing a combustion gas into said chamber and igniting same to produce a gaseous flame whereby to volatilize the hydrocarbon fractions in the soil;

inducing the flow of exhaust gases from said combustion chamber consisting of any volatilized hydrocarbons, partially burned hydrocarbons, spent combustion gas, steam and fines in countercurrent relation to the movement of the soil through said dryer;

filtering solids from said exhaust gases as they are discharged from said dryer and transferring said solids into a waste material collection area;

preheating to raise the temperature of said exhaust gases after filtering the solids therefrom; and catalytically incinerating said exhaust gases after filtration for combustion of any unburned or partially burned hydrocarbons in said exhaust gases.

8. The method according to claim 7, including the step of inducing the flow of exhaust gases from said combustion chamber to establish a negative pressure condition in said combustion chamber, and adjustably controlling the introduction of fresh air into said exhaust gases prior to filtering the solids therefrom in order to regulate the concentration of hydrocarbons in the exhaust gases.

9. The method according to claim 7, including the step of recirculating a portion of the exhaust gases after the filtering step into said combustion chamber to regulate the concentration of hydrocarbons in the exhaust stream.

10. Vehicle-mounted apparatus for removal of hydrocarbon contaminants from soil and other waste matter comprising in combination:

a unitary wheeled frame;

an inclined rotary kiln mounted on said frame including an inlet at an upper end of said kiln and a discharge end at a lower end of said kiln, and means for rotating said kiln about its longitudinal axis;

a burner assembly mounted in said discharge end of said kiln including ignitor means for directing a gaseous flame into the interior of said kiln toward the inlet end;

means on said frame for loading said waste matter into the inlet end of said kiln for advancement along said kiln under rotation thereof whereby to be directly heated by said gaseous flame for a time period sufficient to volatilize any hydrocarbon constituents in said waste matter;

blower means on said frame for inducing the flow of an exhaust stream consisting of any combustion gases and volatilized hydrocarbons and fines upwardly through said kiln including a discharge duct at the inlet end of said kiln for removal of said exhaust stream;

filtering means on said frame for removing any fines from said exhaust stream after it is removed from said kiln;

catalytic incinerator means on said frame for receiving said exhaust stream from said filtering means and raising the temperature of said exhaust stream introduced into said catalytic incinerator means to a level sufficient to burn any unburned or partially burned hydrocarbon constituents remaining in said exhaust stream; and first temperature monitoring means associated with said catalytic incinerator means for sensing the temperature of said exhaust stream prior to its passage into said catalytic incinerator means, and second temperature monitoring means associated with said catalytic incinerator means for sensing the temperature of the exhaust incinerator means for sensing the temperature of the exhaust stream at a discharge end of said catalytic incinerator means.

11. Vehicle-mounted apparatus according to claim 10, including means for recirculating a portion of said exhaust stream from said filtering means into the interior or said kiln, and supplementary air control means on said frame and communicating with said discharge duct for controlling the introduction of air into the exhaust stream independently of said ignition means whereby to regulate the concentration of hydrocarbon constituents in said exhaust stream.

12. Vehicle-mounted apparatus according to claim 10, said supplementary air control means including a port and valve means associated with said port being movable to regulate the quantity of air induced into said exhaust stream from the atmosphere by said blower means.

13. Vehicle-mounted apparatus according to claim 10, said catalytic incinerator means including a preheat burner for raising the temperature of the exhaust stream to a temperature level in excess of 600° F.

14. Vehicle-mounted apparatus according to claim 10, said filtering means defined by a baghouse, said baghouse and said kiln mounted in juxtaposed relation to one another on said frame.

15. Vehicle-mounted apparatus according to claim 14, said unitary wheeled frame being elongated, and said baghouse and said kiln disposed in recessed portions of said frame for extension parallel to the length of said frame.

16. Vehicle-mounted apparatus according to claim 15, said kiln having an inlet end adjacent to a forward end of said frame, a conveyor mounted on the forward end of said frame for advancing soil into said inlet end, and said loading means including a loading hopper mounted above said conveyor for gravity flow of the soil onto said conveyor.

17. Vehicle-mounted apparatus according to claim 16, said loading hopper having an upper inclined grate to limit the size of soil passing through said hopper onto said conveyor.

18. Vehicle-mounted apparatus according to claim 10, including means for removing solid aggregates from said kiln and collecting same in a waste collection area.

19. Vehicle-mounted apparatus according to claim 10, said burner assembly having a source of propane and a combustion air blower for intermixing air with propane and introducing through a burner nozzle at said lower discharge end of said kiln.

* * * * *